United States Patent
Livingston et al.

(10) Patent No.: US 10,787,876 B1
(45) Date of Patent: Sep. 29, 2020

(54) ROTARY LATCH DEVICE

(71) Applicant: OIL STATES ENERGY SERVICES, L.L.C., Houston, TX (US)

(72) Inventors: Jimmy Livingston, Manvel, TX (US); Bob McGuire, Meridian, OK (US)

(73) Assignee: Oil States Energy Services, L.L.C., Houston, TX (US)

( * ) Notice: Subject to any disclaimer, the term of this patent is extended or adjusted under 35 U.S.C. 154(b) by 0 days.

(21) Appl. No.: 16/722,146

(22) Filed: Dec. 20, 2019

(51) Int. Cl.
*E21B 33/03* (2006.01)
*F16L 23/04* (2006.01)
*F16L 23/12* (2006.01)

(52) U.S. Cl.
CPC ............. *E21B 33/03* (2013.01); *F16L 23/04* (2013.01); *F16L 23/12* (2013.01)

(58) Field of Classification Search
CPC . F16L 23/06; F16L 23/08; F16L 37/10; E21B 33/03
See application file for complete search history.

(56) References Cited

U.S. PATENT DOCUMENTS

| | | | | |
|---|---|---|---|---|
| 1,761,157 A * | 6/1930 | Schellin | ................... | F16L 37/10 285/34 |
| 1,920,524 A * | 8/1933 | Reed | ................... | F16L 37/0847 285/34 |
| 2,645,506 A * | 7/1953 | Sturgis | ................ | F16L 37/1205 285/310 |
| 3,026,128 A * | 3/1962 | Willis | ..................... | F16L 23/04 285/18 |
| 3,086,796 A * | 4/1963 | Yancey | ................. | F16L 15/001 285/81 |
| 3,214,202 A * | 10/1965 | Maychark | ............... | F16L 37/20 285/364 |
| 4,402,533 A * | 9/1983 | Ortloff | .................... | F16L 37/10 285/18 |
| 7,731,201 B2 * | 6/2010 | Murata | ............ | B23B 31/16004 279/114 |
| 9,127,700 B2 * | 9/2015 | Wendel | .................... | F16B 21/16 |
| 10,030,461 B2 * | 7/2018 | Johansen | ............ | E21B 33/0355 |
| 10,125,556 B1 * | 11/2018 | Erdman, Jr. | .............. | B25B 1/20 |

* cited by examiner

*Primary Examiner* — Blake E Michener
(74) *Attorney, Agent, or Firm* — Morgan, Lewis & Bockius LLP (57) ABSTRACT

A latching assembly to couple a first mandrel to a second mandrel is disclosed. The latching assembly includes a plurality of wedge members disposed circumferentially and a guide plate. Each wedge member may include a semi-annular wedge body, an upper engagement lip, a lower engagement lip, and a guide pin. The guide plate may include a plurality of guide slots to translate and rotate the plurality of wedge members via the respective guide pins. Because the plurality of wedge members can be translated and rotated to lock and release the first mandrel to and from the second mandrel, the latching assembly can simplify the connection and disconnection of a first mandrel with the second mandrel.

22 Claims, 9 Drawing Sheets

ROTARY LATCH DEVICE

TECHNICAL FIELD

The present disclosure relates generally to wellhead systems, and, more particularly, to latching devices for use with wellhead systems.

BACKGROUND

Tools and equipment can be used for a wide variety of purposes with oil and gas wells. For example, wireline tools can lower instruments into a wellbore on the end of a wireline cable to measure wellbore properties or perform operations within the wellbore. During operation, tools and equipment can be attached and removed from an oil and gas well.

Wellhead systems can provide a surface interface to allow tools and equipment to be coupled with an oil and gas well. For example, a wireline tool can be aligned with and coupled to a wellhead system. However, one drawback of conventional interfaces is that aligning and coupling a tool to the surface interface often requires personnel to be exposed to potentially hazardous conditions. Further, tools may be improperly aligned and/or incompletely secured to conventional interfaces. Improper alignment or incomplete coupling can lead to leakage or a risk of blowout. Therefore, what is needed is an apparatus, system or method that addresses one or more of the foregoing issues, among one or more other issues.

SUMMARY OF THE INVENTION

A latching assembly to couple a first mandrel to a second mandrel is disclosed. The latching assembly includes a plurality of wedge members disposed circumferentially and a guide plate. Each wedge member may include a semi-annular wedge body, an upper engagement lip, a lower engagement lip, and a guide pin. The guide plate may include a plurality of guide slots to translate and rotate the plurality of wedge members via the respective guide pins. Because the plurality of wedge members can be translated and rotated to lock and release the first mandrel to and from the second mandrel, the latching assembly can simplify the connection and disconnection of a first mandrel with the second mandrel.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Figure 1:
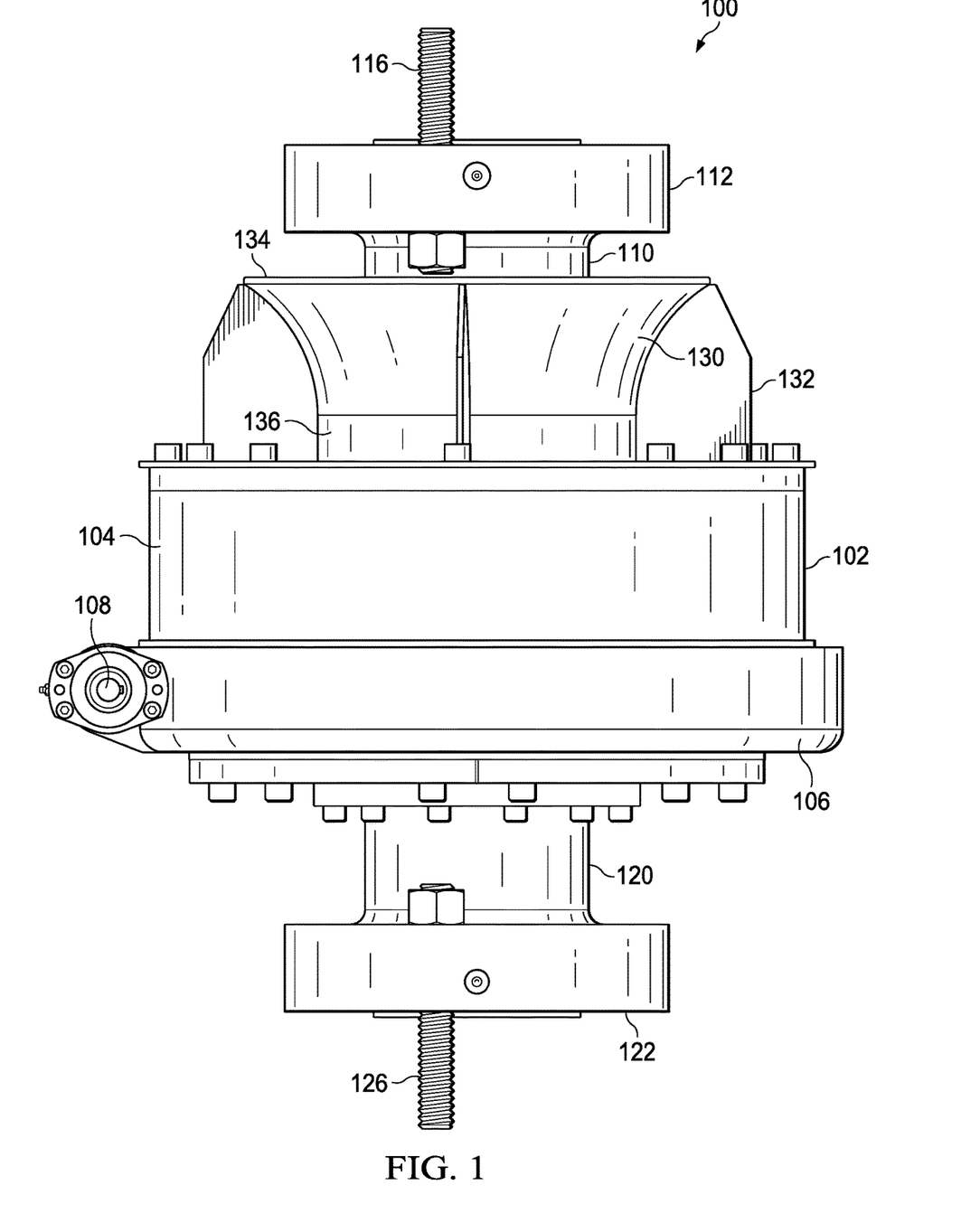
FIG. 1 is an elevation view of an embodiment of a rotary latch device.
Figure 2:
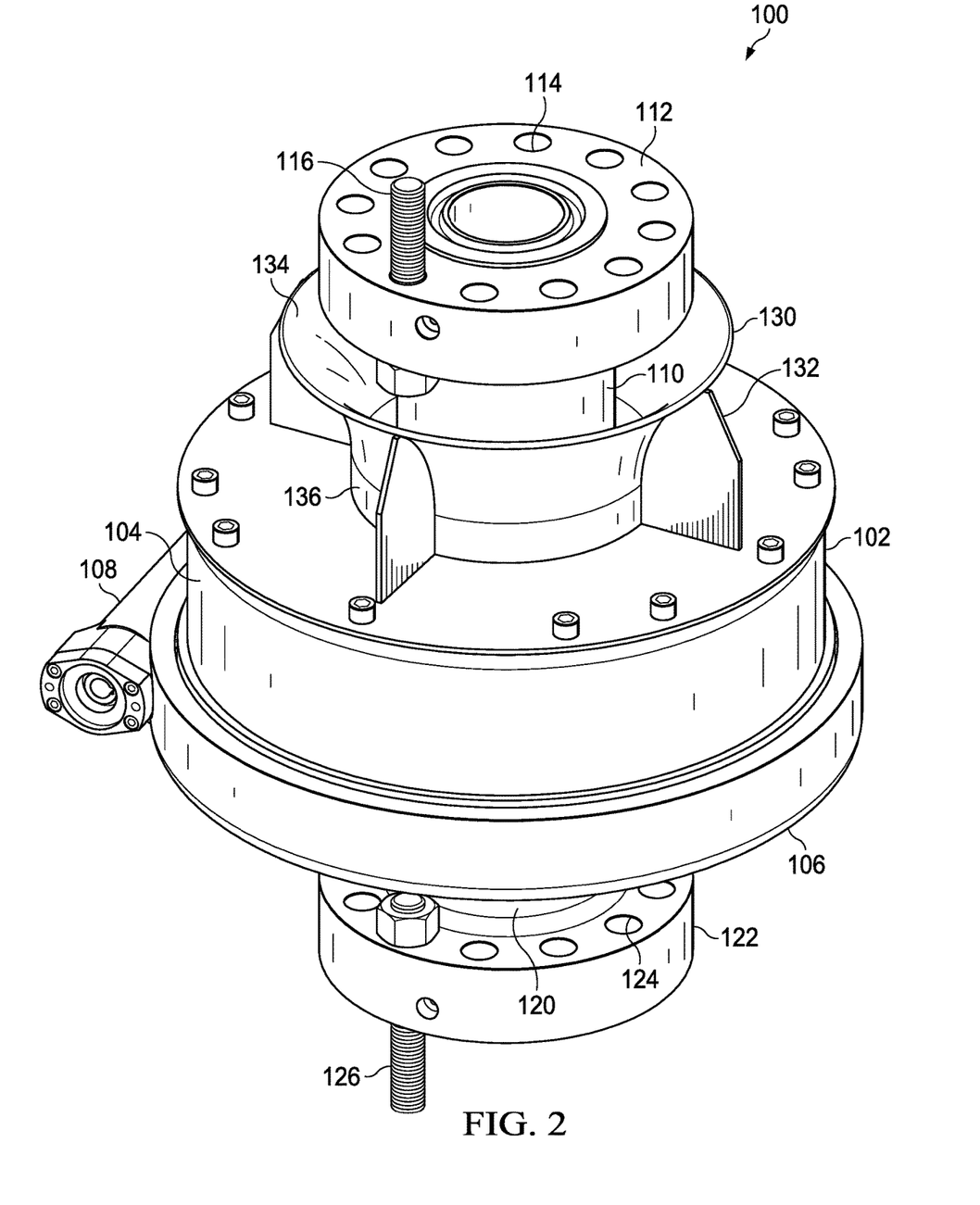
FIG. 2 is an isometric view of the rotary latch device of FIG. 1.

FIG. 1 is an elevation view of an embodiment of a rotary latch device 100. FIG. 2 is an isometric view of the rotary latch device 100 of FIG. 1. With reference to FIGS. 1 and 2, the rotary latch device 100 can receive a tool mandrel 110 and latch and/or engage the tool mandrel 110 to a wellhead connection mandrel 120.

In the depicted example, the rotary latch device 100 can be coupled to the wellhead connection mandrel 120. As illustrated, the wellhead connection mandrel 120 can be coupled to a lower portion 106 of the device housing 102. In some applications, the wellhead connection mandrel 120 can allow access to a wellbore via a wellhead in fluid communication with the wellhead connection mandrel 120. The wellhead connection mandrel 120 can be coupled to downstream wellbore components with a flange 122. Fasteners 126 can extend through fastener holes 124 to secure the flange 122 to downstream wellbore components. As described herein, the rotary latch device 100 can be coupled to the wellhead connection mandrel 120 to facilitate and simplify remote engagement and latching of the tool mandrel 110 to the wellhead connection mandrel 120.

During operation, the rotary latch device 100 can receive the tool mandrel 110 via a receiver 130. Optionally, the tool mandrel 110 can be part of a wellbore tool or equipment, such as a wireline tool, etc., configured for use in the wellbore. In some embodiments, the tool mandrel 110 can be coupled to other portions of a wellbore tool or other wellbore components via a flange 112. Fasteners 116 can extend through fastener holes 114 to secure the flange 112 to other portions of the wellbore tool or other wellbore components.

In the illustrated embodiment, the rotary latch device 100 includes a receiver 130 to align and direct the tool mandrel 110 into engagement with the wellhead connection mandrel 120 within the device housing 102. As shown, the receiver 130 extends out of the upper portion 104 of the device housing 102. The receiver 130 can include a flared portion 134 that tapers into the receiver mandrel 136. Advantageously, by increasing the diameter of the flared portion 134 relative to the receiver mandrel 136, the tool mandrel 110 can be directed and self-aligned into the receiver mandrel 136, during a stab-in procedure. Optionally, the receiver 130 can include support tabs 132 extending from the flared portion 134 of the receiver 130 to the device housing 102.

Upon entering the receiver mandrel 136, the receiver mandrel 136 can direct the tool mandrel 110 into alignment and engagement with the wellhead connection mandrel 120. Upon engagement with the wellhead connection mandrel 120, the rotary latch device 100 can latch or lock the tool mandrel 110 to the wellhead connection mandrel 120. In some embodiments, the latch mechanism of the rotary latch device 100 can be actuated by an actuation assembly disposed within an actuation housing 108.

Figure 3:
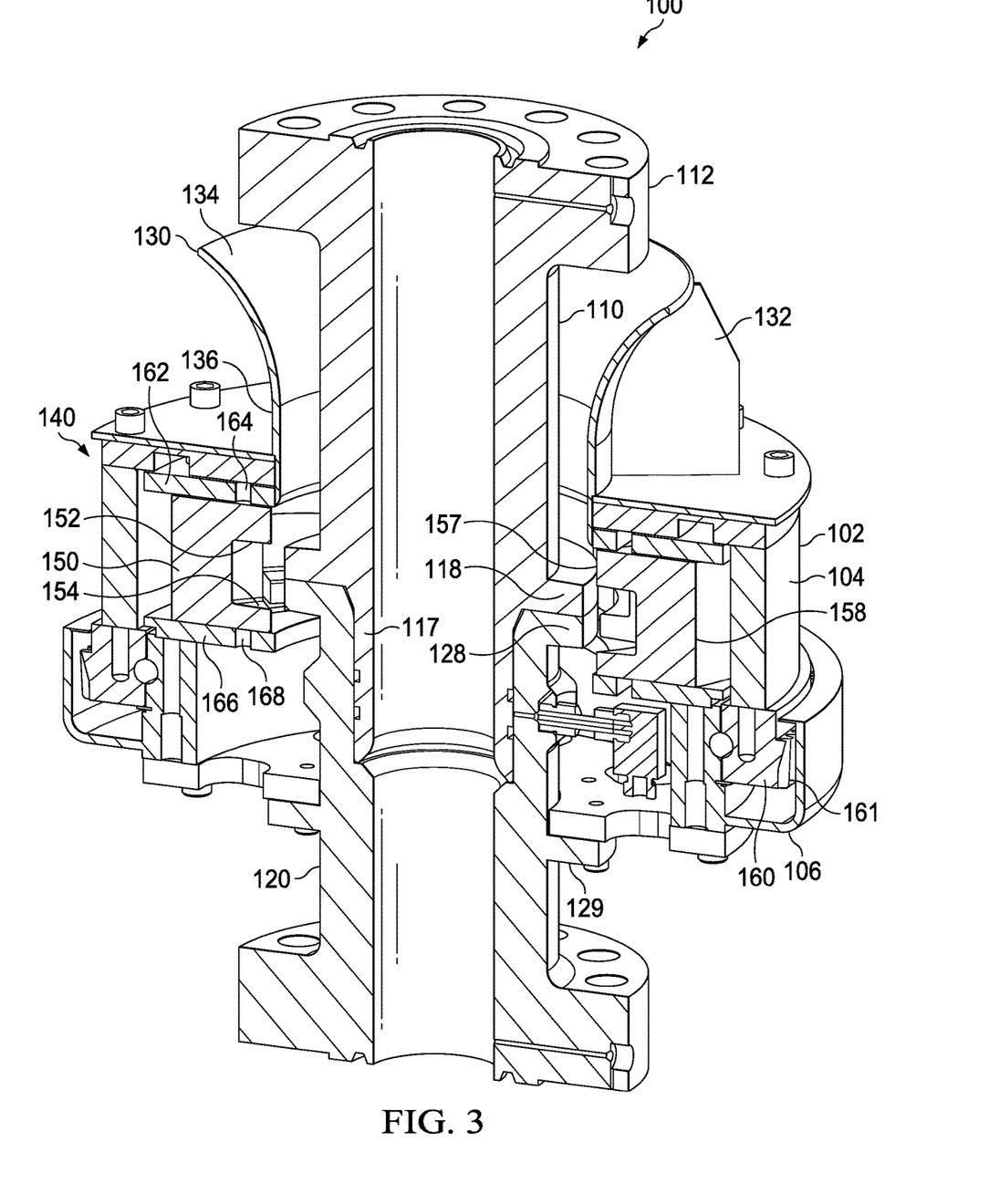
FIG. 3 is a partial cross-sectional view of the rotary latch device of FIG. 1 with a latching assembly in a released position.

FIG. 3 is a partial cross-sectional view of the rotary latch device 100 of FIG. 1 with a latching assembly 140 in a released position. In the depicted example, the latching assembly 140 is shown in a released position or configuration to permit engagement of the tool mandrel 110 with the wellhead connection mandrel 120 or to permit removal of the tool mandrel 110 from the rotary latch device 100.

In the depicted example, the tool mandrel 110 is shown engaged with the wellhead connection mandrel 120. As illustrated, the mating flange 118 of the tool mandrel 110 engages with the mating flange 128 of the wellhead connection mandrel 120. Optionally, the mating flange 118 and the mating flange 128 can sealingly engage to prevent leaks.

In some embodiments, the tool mandrel 110 includes a mandrel extension 117 configured to extend into and engage with the inner bore of wellhead connection mandrel 120. The mandrel extension 117 can further aid in aligning the tool mandrel 110 with the wellhead connection mandrel 120 during engagement. Sealing elements may also be included at the interface between mandrel extension 117 and the inner bore of wellhead connection mandrel 120. As illustrated, the wellhead connection mandrel 120 can further be coupled to the rotary latch device 100 at a coupling flange 129.

As illustrated, the irising wedges 150 of the latching assembly 140 can be circumferentially spaced apart in a released configuration to allow the tool mandrel 110 to engage or disengage from the wellhead connection mandrel 120. As can be appreciated, the irising wedges 150 can be sufficiently radially spaced apart to allow the tool mandrel 110 to move axially relative to the wellhead connection mandrel 120.

Figure 4:
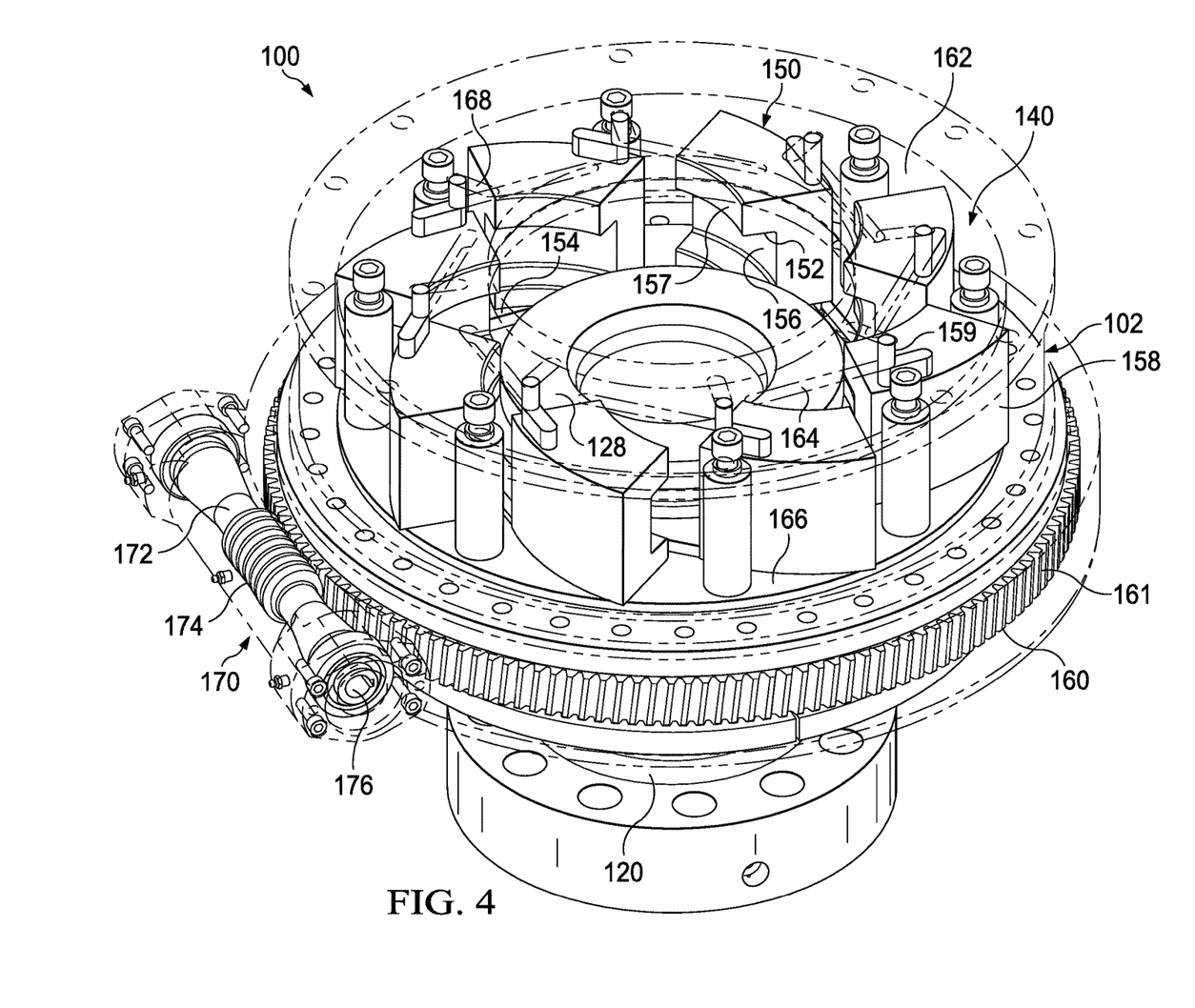
FIG. 4 is an isometric view of the rotary latch device of FIG. 1 with the device housing shown in hidden lines to show the latching mechanism in a released position.
Figure 5:
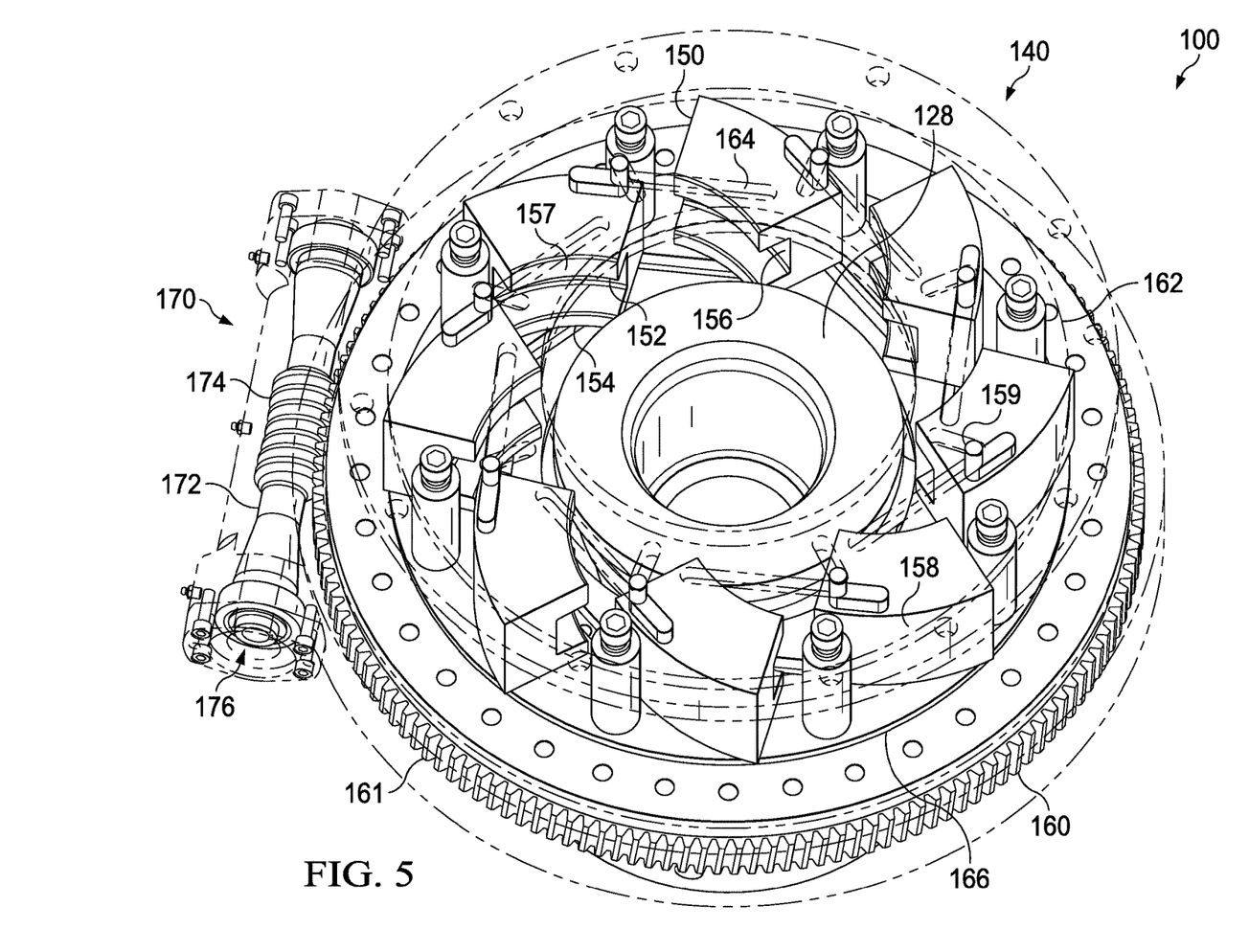
FIG. 5 is an isometric view of the rotary latch device of FIG. 1 with the device housing shown in hidden lines and with the latching assembly in a released position.

FIGS. 4 and 5 are isometric views of the rotary latch device 100 of FIG. 1 with the device housing 102 shown in hidden lines to show the latching assembly 140 in a released position. With reference to FIGS. 3-5, each of the irising wedges 150 has a generally semi-annular shape. Each irising wedge 150 can be a geometric sector of an overall annular shape. In the illustrated embodiment, the latching assembly 140 includes 8 semi-annular irising wedges 150 that can be arranged to form an annular shape as described herein. In some embodiments, the latching assembly 140 can include any suitable number of irising wedges 150.

As shown, each irising wedge 150 can include an upper engagement lip 152 and a lower engagement lip 154, each radially extending from the main body of irising wedge 150. As illustrated, the lower engagement lip 154 can be axially spaced apart from the upper engagement lip 152. The axial space between lower engagement lip 154 and upper engagement lip should be sufficient to accommodate the combined axial width of mating flange 118 of tool mandrel 110 and mating flange 128 of wellhead connection mandrel 120. Further, an inner circumferential engagement surface 156 can be defined opposite to the outer surface 158 and between the upper engagement lip 152 and the lower engagement lip 154.

In the depicted example, the irising wedges 150 are disposed between an upper guide plate 162 and a lower guide plate 166 to retain and guide the irising wedges 150. During operation, the irising wedges 150 can be moved into a released configuration by rotating an upper guide plate 162 and/or a lower guide plate 166. As the upper guide plate 162 and/or the lower guide plate 166 are rotated, guide slots 164, 168 can engage with guide pins 159 to translate and/or rotate the irising wedges 150 into the released configuration. In some embodiments, as the upper guide plate 162 is rotated in a counter-clockwise direction, the guide slots 164 can engage with the guide pins 159 to radially move the irising wedges 150 away from the wellhead connection mandrel 120.

As illustrated, the upper guide plate 162 includes a plurality of angularly disposed guide slots 164. The upper guide plate 162 can include a corresponding number of guide slots 164 to receive a respective guide pin 159 from each irising wedge 150. As can be appreciated, the guide slots 164 can be formed with a desired angle having a radial and/or tangential component to provide a desired actuation behavior of the irising wedges 150 when the upper guide plate 162 is rotated. It should be understood that the guide pins 159 of irising wedges 150 may engage only with guide slots 164 in upper guide plate 162, only with guide slots 168 in lower guide plate 166, or with a combination of both. Further, in some embodiments, guide slots may only be present on one of upper guide plate 162 or lower guide plate 166.

In some embodiments, the lower guide plate 166 can include a plurality of angularly disposed guide slots 168. Optionally, the guide slots 168 can be offset in position and/or angle from the guide slots 164. Further, the guide pins 159 extending into the guide slots 168 can be offset from the guide pins 159 extending into the guide slots 164. As can be appreciated, the guide slots 168 can be formed with a desired angle having a radial and/or tangential component and offset to provide a desired actuation behavior of the irising wedges 150 when the upper guide plate 162 and/or the lower guide plate 166 is rotated.

During operation, the upper guide plate 162 and/or the lower guide plate 166 can be rotated by an actuation assembly 170 engaged with an actuating gear 160 coupled to the upper guide plate 162 and/or the lower guide plate 166. In the depicted example, the actuation assembly 170 can rotate one or both of the upper guide plate 162 and the lower guide plate 166 to move the irising wedges 150. Optionally, portions of the device housing 102 can rotate as the irising wedges 150 are moved to provide a visual signal of engagement or disengagement of the tool mandrel 110.

In some embodiments, the actuation assembly 170 can include a worm gear 174 that is in meshed engagement with gear teeth 161 of the actuating gear 160. By rotating an actuator shaft 172 of the actuation assembly 170, the worm gear 174 coupled to the actuator shaft 172 can rotate the actuating gear 160 and therefore rotate the upper guide plate 162 and/or the lower guide plate 166 to actuate the irising wedges 150.

Optionally, the actuator shaft 172 and the worm gear 174 can be driven by a motor, such as an electric motor and/or a hydraulic motor. In some embodiments, the motor can rotate the actuator shaft 172 via a shaft input 176 coupled to the actuator shaft 172. Advantageously, by actuating the irising wedges 150 with a motor, the tool mandrel 110 can be engaged and/or disengaged from the wellhead connection mandrel 120 remotely.

Figure 6:
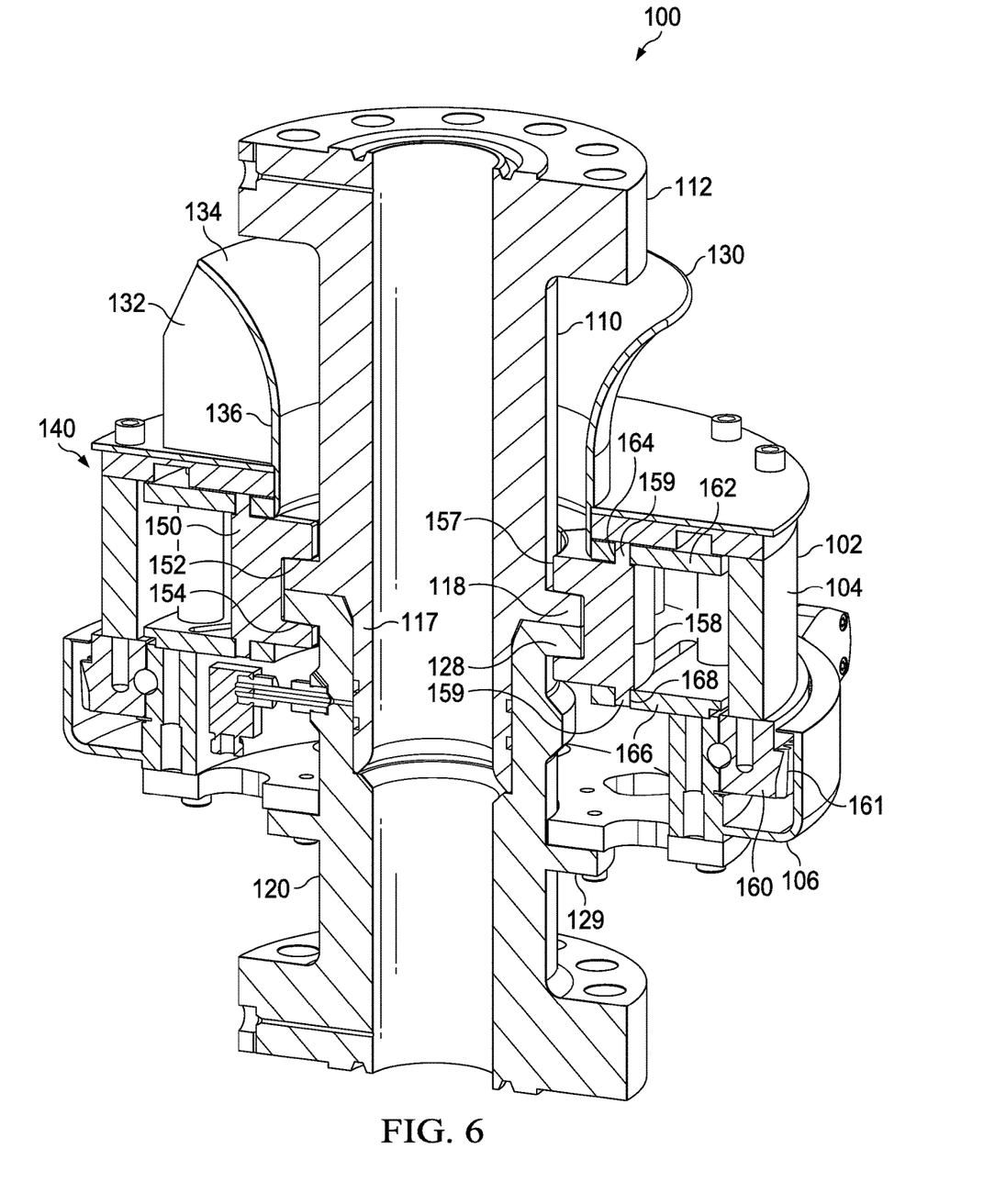
FIG. 6 is a partial cross-sectional view of the rotary latch device of FIG. 1 with a latching assembly in an engaged position.

FIG. 6 is a partial cross-sectional view of the rotary latch device 100 of FIG. 1 with a latching assembly 140 in an engaged position. In the depicted example, the latching assembly 140 is shown in a latched or locked position to secure the tool mandrel 110 to the wellhead connection mandrel 120 during operation.

As described herein, the irising wedges 150 can radially converge or constrict to engage and retain the tool mandrel 110 with the wellhead connection mandrel 120. In some embodiments, the irising wedges 150 cooperatively form an annular shape as the irising wedges 150 converge around the tool mandrel 110 and the wellhead connection mandrel 120. As illustrated, the irising wedges 150 are both axially and radially aligned to engage with the mating flanges 118, 128.

Figure 7:
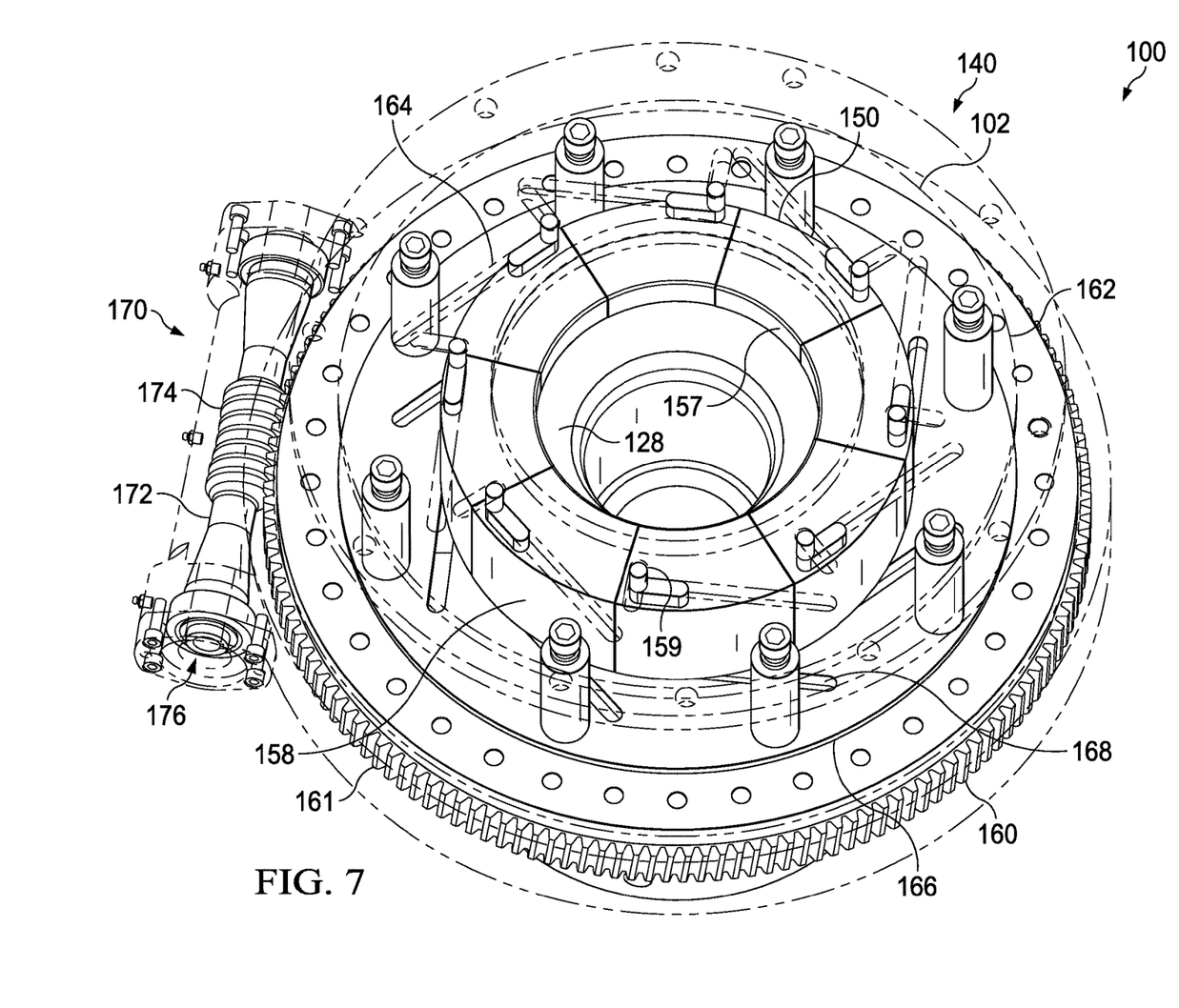
FIG. 7 is an isometric view of the rotary latch device of FIG. 1 with the device housing shown in hidden lines and with the latching assembly in an engaged position.

FIG. 7 is an isometric view of the rotary latch device 100 of FIG. 1 with the device housing 102 shown in hidden lines and with the latching assembly 140 in an engaged position. With reference to FIGS. 6 and 7, upon converging to a locked position, each of the irising wedges 150 can at least partially enclose the mating flanges 118, 128. For example, an upper axial engagement surface defined by the upper engagement lip 152 can engage against the upper surface of the mating flange 118. A lower axial engagement surface defined by the lower engagement lip 154 can engage against the lower surface of the mating flange 128. As illustrated, the lower axial engagement surface is axially spaced apart from the upper axial engagement surface. Advantageously, the upper axial engagement surface and the lower axial engagement surface can cooperatively constrain the mating flanges 118, 128 to prevent axial movement of the tool mandrel 110 and the wellhead connection mandrel 120 relative to each other.

In some embodiments, the inner circumferential engagement surface 156 between the upper engagement lip 152 and the lower engagement lip 154 can engage against the edges of the mating flanges 118, 128. In some embodiments, the inner circumferential engagement surface 156 can limit radial movement of the mating flanges 118, 128 and can improve stability of the coupling between the tool mandrel 110 and the wellhead connection mandrel 120.

Optionally, the inner edges of the upper engagement lip 152 and the lower engagement lip 154 can define mandrel engagement surface 157 configured to engage against portions of the tool mandrel 110 and the wellhead connection mandrel 120. In some applications, the mandrel engagement surface 157 can limit radial movement of the tool mandrel 110 and the wellhead connection mandrel 120.

During operation, the irising wedges 150 can be moved into a locking configuration by rotating an upper guide plate 162 and/or a lower guide plate 166. As the upper guide plate 162 and/or the lower guide plate 166 are rotated, guide slots 164, 168 can engage with the guide pins 159 of the irising wedges 150 to translate and/or rotate the irising wedges 150 into the locking configuration. In some embodiments, as the upper guide plate 162 is rotated in a clockwise direction, the guide slots 164 can engage with the guide pins 159 to radially move the irising wedges 150 toward the mating flanges 118, 128 to retain the tool mandrel 110 with the wellhead connection mandrel 120.

As can be appreciated, the guide slots 164, 168 of the upper guide plate 162 and the lower guide plate 166 can be configured to rotate and/or translate the irising wedges 150 into an annular shape upon rotation of the upper guide plate 162 and/or the lower guide plate 166.

During operation, the actuation assembly 170 can rotate one or both of the upper guide plate 162 and the lower guide plate 166 to move the irising wedges 150 between a released position and an engaged or locked position.

Figure 8:
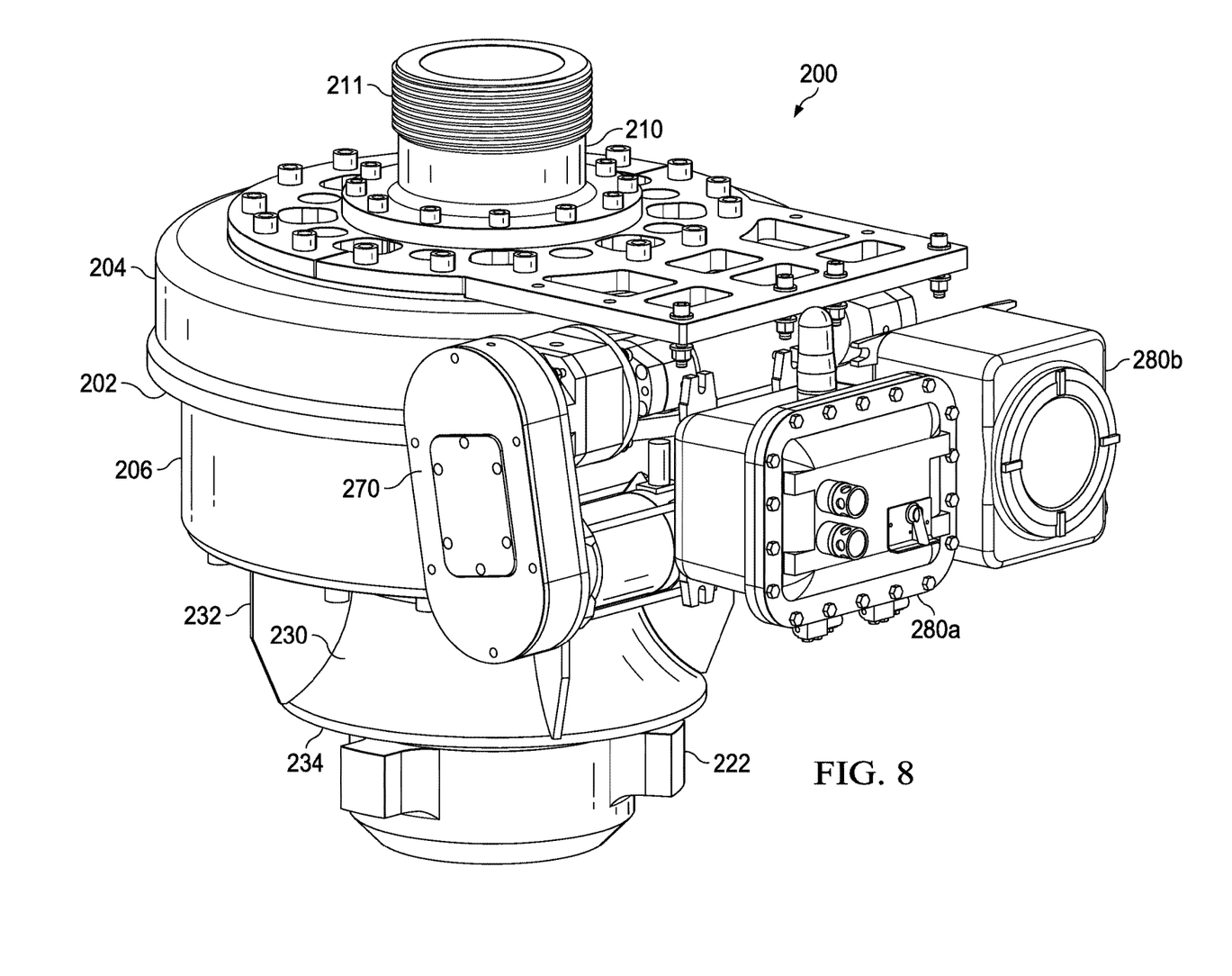
FIG. 8 is an isometric view of an embodiment of a rotary latch device.
Figure 9:
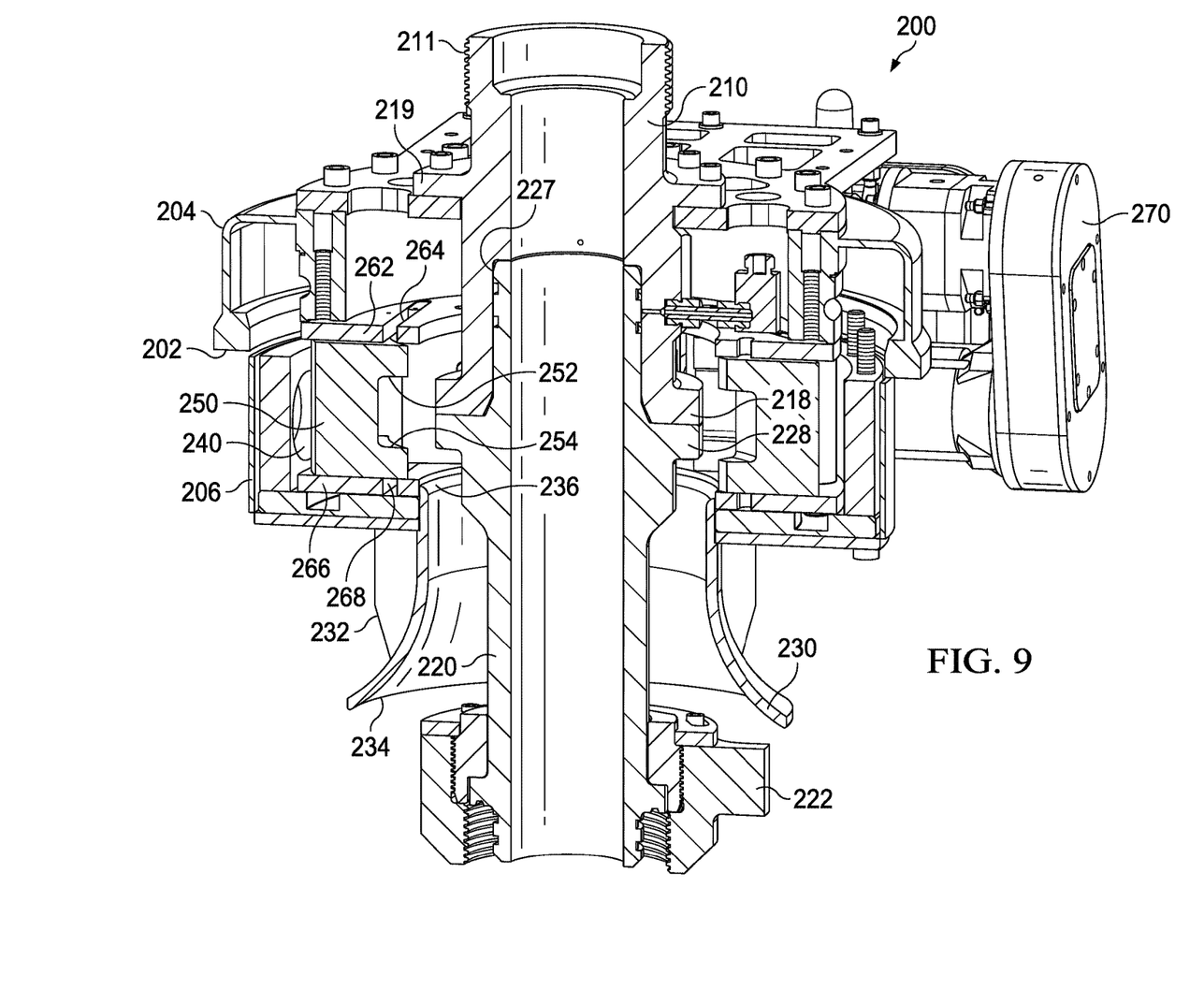
FIG. 9 is a partial cross-sectional view of the rotary latch device of FIG. 8.

FIG. 8 is an isometric view of an embodiment of a rotary latch device 200. FIG. 9 is a partial cross-sectional view of the rotary latch device 200 of FIG. 8. With reference to FIGS. 8 and 9, the rotary latch device 200 can be inverted or flipped in comparison to the rotary latch device 100, such that the rotary latch device 200 can receive a wellhead connection mandrel 220 and latch and/or engage the wellhead connection mandrel 220 to a tool mandrel 210. As can be appreciated, the rotary latch device 200 can include features that are similar to those of rotary latch device 100. Accordingly, similar features may be referred to with similar reference numerals.

In the depicted example, the rotary latch device 200 can be coupled to the tool mandrel 210. As illustrated, the tool mandrel 210 can be coupled to an upper portion 204 of the device housing 202. Optionally, the tool mandrel 210 can be part of a wellbore tool or equipment, such as a wireline tool, etc., configured for use in the wellbore. In some embodiments, the tool mandrel 210 can be coupled to other portions of a wellbore tool or other wellbore components via a threaded portion 211. As described herein, the rotary latch device 200 can be coupled to the tool mandrel 210 to facilitate and simplify remote engagement and latching of the wellhead connection mandrel 220 to the tool mandrel 210.

During operation, the rotary latch device 200 can receive the wellhead connection mandrel 220 via a receiver 230. In some applications, the wellhead connection mandrel 220 can allow access to a wellbore via a wellhead in fluid communication with the wellhead connection mandrel 220. The wellhead connection mandrel 220 can be coupled to downstream wellbore components with a threaded connection 222. Optionally, the threaded connection 222 can be outfitted with a variety of connection types and/or sizes. Advantageously, the rotary latch device 200 can allow rapid connection and disconnection of the tool mandrel 210 from the wellhead connection mandrel 220.

In the illustrated embodiment, the rotary latch device 200 includes a receiver 230 to align and direct the wellhead connection mandrel 220 into engagement with the tool mandrel 210 within the device housing 202. As shown, the receiver 230 extends out of the lower portion 206 of the device housing 202. The receiver 230 can include a flared portion 234 that tapers into the receiver mandrel 236. Advantageously, by increasing the diameter of the flared portion 234 relative to the receiver mandrel 236, the wellhead connection mandrel 220 can be directed and self-aligned into the receiver mandrel 236 during a stab-in procedure. Optionally, the receiver 230 can include support tabs 232 extending from the flared portion 234 of the receiver 230 to the device housing 202.

Upon entering the receiver mandrel 236, the receiver mandrel 236 can direct the wellhead connection mandrel 220 into alignment and engagement with the tool mandrel 210. Upon engagement with the tool mandrel 210, the rotary latch device 200 can latch or lock the wellhead connection mandrel 220 to the tool mandrel 210, similar to as described with respect to rotary latch device 100.

In the depicted example, the latching assembly 240 is shown in a released position or configuration to permit engagement of the wellhead connection mandrel 220 with the tool mandrel 210 or to permit removal of the wellhead connection mandrel 220 from the rotary latch device 200.

In the depicted example, the wellhead connection mandrel 220 is shown engaged with the tool mandrel 210. As illustrated, the mating flange 228 of the wellhead connection mandrel 220 engages with the mating flange 218 of the tool mandrel 210. Optionally, the mating flange 228 and the mating flange 218 can sealingly engage to prevent leaks.

In some embodiments, the wellhead connection mandrel 220 includes a mandrel extension 227 configured to extend into and engage with the inner bore of tool mandrel 210. The mandrel extension 227 can further aid in aligning the wellhead connection mandrel 220 with the tool mandrel 210 during engagement. Sealing elements may also be included at the interface between mandrel extension 227 and the inner bore of tool mandrel 210. As illustrated, the tool mandrel 210 can further be coupled to the rotary latch device 200 at a coupling flange 219.

Similar to rotary latch device 100, the rotary latch device 200 can include a latching assembly 240 with a plurality of irising wedges 250 to allow the wellhead connection mandrel 220 to engage or disengage from the tool mandrel 210. As can be appreciated, the latching assembly 240 can operate in a similar manner as described with respect to latching assembly 140. For example, the irising wedges 250 can radially converge or constrict to engage and retain the tool mandrel 210 with the wellhead connection mandrel 220. In some embodiments, the irising wedges 250 cooperatively form an annular shape as the irising wedges 250 converge around the tool mandrel 210 and the wellhead connection mandrel 220. In an engagement position, the irising wedges 250 can be both axially and radially aligned to engage with the mating flanges 218, 228.

In some embodiments, the latching assembly 240 can be actuated by an actuation assembly 270. Optionally, the actuation assembly 270 can include a motor or actuator that is operatively coupled to a drive mechanism, such as a worm gear to rotate the upper guide plate 262 and/or the lower guide plate 266 to actuate the irising wedges 250. In some embodiments, the actuation assembly 270 can include a motor that is coupled to a worm gear by a belt or other drive mechanism. Further, the actuation assembly 270 or the rotary latch device 200 generally can be controlled by hardware disposed within the control boxes 280a and 280b. The control boxes 280a and 280b can include control hardware, wireless transceivers, and/or power supplies. The actuation assembly 270 and the control boxes 280a and 280b can be coupled or otherwise attached to the device housing 202.

It is understood that variations may be made in the foregoing without departing from the scope of the present disclosure. In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

The invention claimed is:

1. A latching assembly to couple a first mandrel to a second mandrel, the latching assembly comprising:
   a plurality of wedge members disposed circumferentially, wherein each wedge member comprises:
      a wedge body comprising a semi-annular shape;
      an upper engagement lip extending from the wedge body, the upper engagement lip defining an upper axial engagement surface;
   a lower engagement lip extending from the wedge body, the lower engagement lip defining a lower axial engagement surface, wherein the lower axial engagement surface is axially spaced apart from the upper axial engagement surface; and
      a guide pin rigidly connected to the wedge body; and
   a guide plate comprising a plurality of guide slots, wherein each guide slot receives each guide pin of a respective wedge member, and
   wherein the guide plate is configured to rotate the plurality of guide slots, such that the plurality of wedge members are radially translated and rotated about an axis through the guide pin.

2. The latching assembly of claim 1, wherein each wedge member further comprises an inner engagement surface disposed between the upper engagement lip and the lower engagement lip.

3. The latching assembly of claim 1, wherein the plurality of wedge members form an annulus around the first mandrel and the second mandrel in a locked position.

4. The latching assembly of claim 1, the latching assembly further comprising: an offset guide plate axially spaced apart from the guide plate, the offset guide plate comprising a plurality of offset guide slots, wherein each offset guide slot receives an offset guide pin of the respective wedge member.

5. The latching assembly of claim 1, the latching assembly further comprising:
   an actuating gear coupled to the guide plate, wherein the actuating gear is configured to rotate the guide plate.

6. The latching assembly of claim 5, the latching assembly further comprising:
   an actuator assembly in meshed engagement with the actuating gear, wherein the actuator assembly rotates the actuating gear.

7. The latching assembly of claim 6, wherein the actuator assembly comprises:
   an actuator shaft in meshed engagement with the actuating gear; and
   a worm gear coupled to the actuator shaft.

8. A rotary latch device to couple a first mandrel to a second mandrel, the rotary latch device comprising:
   a housing; and
   a latching assembly disposed within the housing, the latching assembly comprising: a plurality of wedge members disposed circumferentially, wherein each wedge member comprises:
      a wedge body comprising a semi-annular shape;
      an upper engagement lip extending from the wedge body, the upper engagement lip defining an upper axial engagement surface;
      a lower engagement lip extending from the wedge body, the lower engagement lip defining a lower axial engagement surface, wherein the lower axial engagement surface is axially spaced apart from the upper axial engagement surface; and
      a guide pin rigidly connected to the wedge body; and
   a guide plate comprising a plurality of guide slots, wherein each guide slot receives each guide pin of a respective wedge member, and
   wherein the guide plate is configured to rotate the plurality of guide slots, such that the plurality of wedge members are radially translated and rotated about an axis through the guide pin.

9. The rotary latch device of claim 8, wherein the housing comprises:
   a receiver to direct the first mandrel toward the second mandrel, the receiver comprising:
   a receiver mandrel extending from the latch assembly.

10. The rotary latch device of claim 9, wherein the receiver includes a flared portion configured to align the first mandrel into the receiver mandrel.

11. The rotary latch device of claim 9, wherein the receiver includes a support tab extending along the receiver mandrel.

12. The rotary latch device of claim 8, wherein each wedge member further comprises an inner engagement surface disposed between the upper engagement lip and the lower engagement lip.

13. The rotary latch device of claim 8, wherein the plurality of wedge members form an annulus around the first mandrel and the second mandrel in a locked position.

14. The rotary latch device of claim 8, the latching assembly further comprising:
   an actuating gear coupled to the guide plate, wherein the actuating gear is configured to rotate the guide plate.

15. The rotary latch device of claim 14, the latching assembly further comprising:
   an actuator assembly in meshed engagement with the actuating gear, wherein the actuator assembly rotates the actuating gear.

16. The rotary latch device of claim 15, wherein the housing comprises an actuator housing enclosing the actuator assembly.

17. The rotary latch device of claim 15, wherein the actuator assembly comprises:
   an actuator shaft in meshed engagement with the actuating gear; and
   a worm gear coupled to the actuator shaft.

18. A method to couple a first mandrel to a second mandrel, the method comprising:
   positioning a first mandrel and a second mandrel adjacent to each other;
   rotating a guide plate comprising a plurality of guide slots each engaging a guide pin rigidly connected to a corresponding semi-annular wedge member, such that said step of rotating the guide plate causes:
      each semi-annular wedge member to rotate about an axis formed by its respective guide pin;
      said semi-annular wedge members to form an annulus;
      said first mandrel to engage an upper engagement lip extending from one or more wedge members; and
      said second mandrel to engage a lower engagement lip extending from one or more wedge members and axially spaced apart from the upper engagement lip, such that the first mandrel and the second mandrel are coupled within the annulus.

19. The method of claim 18, further comprising:
   receiving the first mandrel against the second mandrel with the plurality of semi-annular wedge members in a released configuration.

20. The method of claim 18, further comprising:
   rotating a guide plate to translate and rotate the plurality of semi-annular wedge members.

21. The method of claim 18, wherein the step of rotating the guide plate is performed using an actuating gear.

22. The method of claim 18, wherein the step of positioning the first mandrel and the second mandrel adjacent to each other is performed using a receiver mandrel.

* * * * *